United States Patent
Cao et al.

(10) Patent No.: US 10,454,265 B2
(45) Date of Patent: Oct. 22, 2019

(54) BRIDGE-TYPE CIRCUIT, AND DIRECT CURRENT BREAKING DEVICE AND CONTROL METHOD THEREOF

(71) Applicants: NR ELECTRIC CO., LTD, Jiangsu (CN); NR ENGINEERING CO., LTD, Jiangsu (CN)

(72) Inventors: Dongming Cao, Jiangsu (CN); Taixun Fang, Jiangsu (CN); Yeyuan Xie, Jiangsu (CN); Bing Yang, Jiangsu (CN); Wei Shi, Jiangsu (CN); Wei Lv, Jiangsu (CN); Wenjie Wang, Jiangsu (CN); Bin Liu, Jiansu (CN); Tao Wang, Jiangsu (CN)

(73) Assignees: NR ELECTRIC CO., LTD, Jiangsu (CN); NR ENGINEERING CO., LTD, Jiangsu (CN)

( * ) Notice: Subject to any disclaimer, the term of this patent is extended or adjusted under 35 U.S.C. 154(b) by 0 days.

(21) Appl. No.: 16/086,011

(22) PCT Filed: Apr. 17, 2017

(86) PCT No.: PCT/CN2017/080820
§ 371 (c)(1),
(2) Date: Sep. 18, 2018

(87) PCT Pub. No.: WO2017/181928
PCT Pub. Date: Oct. 26, 2017

(65) Prior Publication Data
US 2019/0097411 A1   Mar. 28, 2019

(30) Foreign Application Priority Data
Apr. 19, 2016 (CN) .......................... 2016 1 0244920

(51) Int. Cl.
*H02H 3/08* (2006.01)
*H02H 3/087* (2006.01)
(Continued)

(52) U.S. Cl.
CPC ............ *H02H 3/087* (2013.01); *H01H 83/20* (2013.01); *H02H 3/02* (2013.01); *H02H 3/021* (2013.01); *H02H 3/06* (2013.01)

(58) Field of Classification Search
CPC ........... H02H 3/087; H02H 3/02; H01H 83/20
See application file for complete search history.

(56) References Cited

U.S. PATENT DOCUMENTS 9,948,089 B2 * 4/2018 Horinouchi ...... H03K 17/08128
9,972,997 B2 * 5/2018 Davidson ........... H03K 17/0828
(Continued)

FOREIGN PATENT DOCUMENTS

| CN | 102823121 | 12/2012 |
| CN | 103280763 | 9/2013 |

(Continued)

OTHER PUBLICATIONS

"International Search Report (Form PCT/ISA/210)", dated Jul. 19, 2017, with English translation thereof, pp. 1-4.

*Primary Examiner* — Scott Bauer
(74) *Attorney, Agent, or Firm* — JCIPRNET

(57) ABSTRACT

A bridge-type circuit comprises a H-bridge switch module and a buffering and reclosing module. The H-bridge switch module comprises four power semiconductor switch devices. Every two of the four power semiconductor switch devices are connected in series in the same direction to form a bridge arm, and the two bridge arms are further connected in parallel. Middle points of the two bridge arms respectively serve as an input terminal and an output terminal. The buffering and reclosing module is connected in parallel with
(Continued)

the two bridge arms of the full bridge module. Also provided are a direct current breaking device formed by connecting the above bridge-type circuits in cascade and a control method thereof. The direct current breaking device is provided with the buffering and reclosing module, such that line voltage fluctuation generated during a reclosing operation is small.

24 Claims, 9 Drawing Sheets

(51) Int. Cl.
*H02H 3/02* (2006.01)
*H02H 3/06* (2006.01)
*H01H 83/20* (2006.01)

(56) References Cited

U.S. PATENT DOCUMENTS

| | | | | |
|---|---|---|---|---|
| 2009/0201617 | A1* | 8/2009 | Yamaguchi | H01H 9/40 361/93.9 |
| 2016/0006238 | A1* | 1/2016 | Garces | H02H 9/02 361/52 |
| 2016/0268915 | A1* | 9/2016 | Lin | H02M 1/32 |
| 2016/0322809 | A1* | 11/2016 | Wang | H02H 9/02 |

FOREIGN PATENT DOCUMENTS

| | | |
|---|---|---|
| CN | 103971965 | 8/2014 |
| CN | 104767171 | 7/2015 |
| CN | 105356411 | 2/2016 |
| CN | 105680409 | 6/2016 |
| WO | 2013071980 | 5/2013 |

* cited by examiner

BRIDGE-TYPE CIRCUIT, AND DIRECT CURRENT BREAKING DEVICE AND CONTROL METHOD THEREOF

CROSS-REFERENCE TO RELATED APPLICATION

This application is a 371 application of the international PCT application serial no. PCT/CN2017/080820, filed on Apr. 17, 2017, which claims the priority benefit of China application no. 201610244920.7, filed on Apr. 19, 2016. The entirety of each of the above-mentioned patent applications is hereby incorporated by reference herein and made a part of this specification.

BACKGROUND OF THE INVENTION

Field of the Invention

The present invention relates to the field of direct current breaking devices, and in particular, to a bridge-type circuit and a control method thereof, and a direct current breaking device based on the bridge-type circuit and a control method thereof.

Related Art

With the development of multi-terminal direct current power transmission technologies, a high-voltage direct current breaker will become a key apparatus that ensures a secure and stable operation of a system.

Chinese Patent with publication No. CN102823121A discloses a switch module which is set to limit the current through power transmitting or distribution line and breaking the current in a circuit breaker device, and where an RCD buffer circuit is connected in parallel at each of two ends of a power semiconductor switch device, or every two power semiconductor switch devices that are in series-opposing connection share one full-bridge RCD buffer circuit. Because the direct current breaker needs to break a current of high magnitude, the power semiconductor switch devices are mostly press-connected type devices. The RCD buffer circuit can only be mounted in narrow space defined by the thickness of the heat-dissipation device plus the thickness of the press-connected type power semiconductor switch devices, the sum of the thickness ranging from 50 mm to 80 mm, thus restricting mode selection for diodes and capacitors and their installation. In addition, the direct current breaker uses a large number of power semiconductor switch devices, and therefore there are also a large number of RCD buffer circuits.

Chinese Patent with publication No. CN103280763A discloses a direct current breaker and an implementation method thereof, where a breaking unit and a current conversion unit are formed by connecting full-bridge/half-bridge current converters in cascade. Four power semiconductor switch devices in the full-bridge current converter share one capacitor as a buffer circuit, and two power semiconductor switch devices in the half-bridge current converter share one capacitor as a buffer circuit. This patent uses a small number of buffer circuits and has large installation space as compared with the foregoing patent No. CN102823121A. However, the capacitor of the full-bridge/half-bridge current converter carries a high voltage after the direct current breaker completes a current breaking operation. If a reclosing operation is performed in this case, bridge arms of the full-bridge/half-bridge current converter may short circuit and discharge, resulting in damage to the power semiconductor switch device. Reclosing means that the breaker is switched on in a short period after a circuit failure is cleared. Because most of circuit failures are actually instantaneous or temporary, reclosing is one of power supply self-recovery methods that is frequently used in operation and is an indispensable function of the breaker.

Based on the foregoing problems in the conventional breaker structure, the present invention is produced by in-depth studies of the inventors.

SUMMARY OF THE INVENTION

An objective of the present invention is to provide a bridge-type circuit and a control method thereof, where the circuit includes a small number of buffering and reclosing modules, and has large installation space for these modules.

Another objective of the present invention is to provide a direct current breaking device and a control method thereof, where the device has a reclosing function and line voltage fluctuation generated during a reclosing operation is small.

To achieve the above objectives, the present invention adopts the following solutions:

A bridge-type circuit includes an H-bridge switch module and a buffering and reclosing module. The H-bridge switch module includes four power semiconductor switch devices. Every two of the four power semiconductor switch devices are connected in series in the same direction to form a bridge arm, and the two bridge arms are further connected in parallel. Middle points of the two bridge arms respectively serve as an input terminal and an output terminal. The buffering and reclosing module is connected in parallel with the two bridge arms of the H-bridge switch module. The buffering and reclosing module includes a reclosing circuit and an RCD circuit, or includes a reclosing circuit, a capacitor, and a resistor.

Further, the following six structural manners may be preferably considered for the buffering and reclosing module:

1. The buffering and reclosing module includes an RCD circuit and a reclosing circuit. The RCD circuit includes a diode, a capacitor, and two resistors, where the diode and the capacitor are connected in series, the cathode of the diode is connected to one end of the capacitor, and the two resistors are respectively connected in parallel with the diode and the capacitor. The reclosing circuit includes a resistor and a power semiconductor switch device that are connected in series. The RCD circuit and the reclosing circuit are connected in parallel.

2. The buffering and reclosing module includes an RCD circuit and a reclosing circuit. The RCD circuit includes a diode, a capacitor, and two resistors, where the diode and the capacitor are connected in series, the cathode of the diode is connected to one end of the capacitor, and the two resistors are respectively connected in parallel with the diode and the capacitor. The reclosing circuit includes a resistor, a power semiconductor switch device, and a diode, where the resistor and the power semiconductor switch device are connected in series, the diode is connected in parallel with the resistor, and the power semiconductor switch device and the diode are in series-opposing connection. The RCD circuit and the reclosing circuit are connected in parallel.

3. The buffering and reclosing module includes an RCD circuit and a reclosing circuit. The RCD circuit includes a diode, a capacitor, and two resistors, where the diode and the capacitor are connected in series, the cathode of the diode is connected to one end of the capacitor, and the two resistors are respectively connected in parallel with the diode and the capacitor. The reclosing circuit includes a resistor and a power semiconductor switch device that are connected in series. The reclosing circuit is connected in parallel with the capacitor of the RCD circuit.

4. The buffering and reclosing module includes an RCD circuit and a reclosing circuit. The RCD circuit includes a diode, a capacitor, and two resistors, where the diode and the capacitor are connected in series, the cathode of the diode is connected to one end of the capacitor, and the two resistors are respectively connected in parallel with the diode and the capacitor; and the reclosing circuit includes a resistor, a power semiconductor switch device, and a diode, where the resistor and the power semiconductor switch device are connected in series, the diode is connected in parallel with the resistor, and the power semiconductor switch device and the diode are in series-opposing connection; and the reclosing circuit is connected in parallel with the capacitor of the RCD circuit.

5. The buffering and reclosing module includes a capacitor, a resistor, and a reclosing circuit, where the capacitor, the resistor, and the reclosing circuit are connected in parallel with each other. The reclosing circuit includes a resistor and a power semiconductor switch device that are connected in series.

6. The buffering and reclosing module includes a capacitor, a resistor, and a reclosing circuit, where the capacitor, the resistor, and the reclosing circuit are connected in parallel with each other. The reclosing circuit includes a resistor, a power semiconductor switch device, and a diode, where the resistor and the power semiconductor switch device are connected in series, the diode is connected in parallel with the resistor, and the power semiconductor switch device and the diode are in series-opposing connection.

The present invention further discloses a method for controlling the bridge-type circuit described above. The method controls the bridge-type circuit to switch among the following three working modes: a conduction mode, a breaking mode, and a reclosing mode.

In the conduction mode, the four power semiconductor switch devices of the H-bridge switch module are all in an on state, while the power semiconductor switch device in the buffering and reclosing module is locked in an off state;

in the breaking mode, the four power semiconductor switch devices of the H-bridge switch module are all locked in an off state, and the power semiconductor switch device in the buffering and reclosing module is also locked in an off state; and in the reclosing mode, the four power semiconductor switch devices of the H-bridge switch module are all locked in an off state, while the power semiconductor switch device in the buffering and reclosing module is in an on state.

The present invention further discloses a direct current breaking device having the bridge-type circuit. The device specifically includes a conduction branch, a breaking branch, and an energy consumption branch that are mutually connected in parallel, where the conduction branch is formed by connecting at least one rapid mechanical switch and a current transfer module in series; the breaking branch includes one bridge-type circuit or multiple series-connected bridge-type circuits; and the energy consumption branch is formed by a non-linear resistor.

The bridge-type circuit includes an H-bridge switch module and a buffering and reclosing module. The H-bridge switch module includes four power semiconductor switch devices. Every two of the four power semiconductor switch devices are connected in series in the same direction to form a bridge arm, and the two bridge arms are further connected in parallel. Middle points of the two bridge arms respectively serve as an input terminal and an output terminal. The buffering and reclosing module is connected in parallel with the two bridge arms of the H-bridge switch module. The buffering and reclosing module includes a reclosing circuit and an RCD circuit, or includes a reclosing circuit, a capacitor, and a resistor.

Further, the specific composition and structure of the buffering and reclosing module is the same as that of the buffering and reclosing module in the above-described bridge circuit.

Further, in the direct current breaking device, M conduction branches, M breaking branches, and M energy consumption branches are set, where the conduction branches, the breaking branches, and the energy consumption branches are mutually connected in parallel in one-to-one correspondence to form M current conduction branches, and the M current conduction branches are sequentially connected in series, M being an integer greater than or equal to 1.

Alternatively, two or more breaking branches and energy consumption branches are set, and are connected in parallel in one-to-one correspondence; one conduction branch is set; a sequential series connection is established after all the breaking branches and energy consumption branches are correspondingly connected in parallel; and finally, a branch formed after the series connection is connected in parallel with the conduction branch.

Further, the current transfer module in the conduction branch specifically includes a non-linear resistor and a power semiconductor switch device module that are connected in parallel, where the power semiconductor switch device module includes two or more power semiconductor switch device modules that are connected in series, and at least two of the power semiconductor switch device modules are connected in series in opposite directions.

Alternatively, the current transfer module in the conduction branch specifically includes a non-linear resistor and a power semiconductor switch device module that are connected in parallel, where the power semiconductor switch device module is formed by one full-bridge sub-module or by connecting two or more full-bridge sub-modules in series, the full-bridge sub-module includes four power semiconductor switch devices connected in a bridge type, and a capacitor is further connected in parallel between bridge arms of the full-bridge sub-module.

Alternatively, the current transfer module in the conduction branch specifically includes a non-linear resistor and two unidirectional flow modules, where the two unidirectional flow modules are connected in parallel in opposite directions, and then are connected in parallel with the non-linear resistor $R2$; the unidirectional flow module includes at least one pair of power semiconductor switch devices and at least one pair of diodes, the power semiconductor switch devices and the diodes being connected in series in the same direction.

Alternatively, the current transfer module in the conduction branch specifically includes a non-linear resistor, a power semiconductor switch device series-connected module, and a diode full-bridge module, where the non-linear resistor, the full-controlled device series-connected module and two bridge arms of the diode full-bridge module are connected in parallel; the power semiconductor switch device series-connected module includes at least two full-controlled devices connected in series in the same direction; and each bridge arm of the diode full-bridge module is formed by connecting at least two non-controlled devices in series in a positive direction, and middle points of the two bridge arms respectively serve as an input terminal and an output terminal of the current transfer module.

Alternatively, the current transfer module in the conduction branch specifically includes a non-linear resistor and a power semiconductor switch module that are connected in parallel, where the power semiconductor switch module is formed by one full-bridge sub-module or connecting more than one full-bridge sub-module in series; the full-bridge sub-module includes four power semiconductor switch devices connected in a bridge type and one RCD module; a bridge arm of the full-bridge sub-module is connected in parallel with the RCD module; the RCD module includes a diode, a capacitor, and two resistors, the diode being connected in series with the capacitor, the cathode of the diode being connected to one end of the capacitor, and the two resistors are respectively connected in parallel with the diode and the capacitor.

The present invention further discloses a method for controlling a direct current breaking device, which specifically includes the following conditions:

1) when a direct current system normally operates, a rapid mechanical switch of a conduction branch is in a closed state, a current transfer module is in a switch-on state, and a bridge-type circuit of a breaking branch is in a switch-off state.

2) When the system requires the direct current breaking device to break the current in the case of a short circuit:

201. the bridge-type circuit of the breaking branch is switched on, and then the current transfer module of the conduction branch is locked in switched-off state;

202. after the current is completely transferred from the conduction branch to the breaking branch, the rapid mechanical switch of the conduction branch is switched off; and 203. after the rapid mechanical switch is switched off without an arc, the bridge-type circuit of the breaking branch is switched off; and in this case, the fault current is transferred to a non-linear resistor till system energy is consumed and absorbed, and the direct current breaking device completes current breaking at this time.

3) When the system requires reclosing in a short period after the direct current breaking device completes current breaking:

301. a power semiconductor device of a buffering and reclosing module in the bridge-type circuit of the current breaking branch is switched on, and the bridge-type circuit is in a reclosing mode in this case;

302. it is judged whether the fault of transmission line is recovered:

(1) if the fault is not recovered, the power semiconductor device of the buffering and reclosing module in the bridge-type circuit of the current breaking branch is switched off, to terminate reclosing; or (2) if the fault is recovered, the bridge-type circuit of the current breaking branch is switched on, the power semiconductor device of the buffering and reclosing module in the bridge-type circuit of the current breaking branch is switched off, and step 303 is performed;

303. the mechanical switch of the current conduction branch is closed, and a power semiconductor device of the current transfer module is switched on;

304. the bridge-type circuit of the current breaking branch is switched off; and 305. reclosing is ended.

As a further preferred solution, in step 302, a judgment basis for the transmission line failure recovery includes the following cases:

1) The fault transmission line is charged;
2) no voltage on the current breaking branch;
3) no voltage on each bridge-type circuit in the current breaking branch; and
4) no voltage on the capacitor of the buffering and reclosing module of the bridge-type circuit in the current breaking branch.

By means of the above solutions, the present invention is advantageous in the following aspects:

(1) The direct current breaking device provided by the present invention uses a bridge-type circuit, such that the number of buffering and reclosing modules is small and the installation space of buffering and reclosing modules is large;

(2) the direct current breaking device provided by the present invention has a reclosing function, such that line voltage oscillation during a reclosing operation is small; and (3) the direct current breaking device provided by the present invention uses a modular bridge-type circuit structure, thus facilitating series connection and voltage sharing of power semiconductor devices.

DETAILED DESCRIPTION OF THE INVENTION

The technical solutions of the present invention will be described in detail below with reference to the accompanying drawings.

Figure 1:
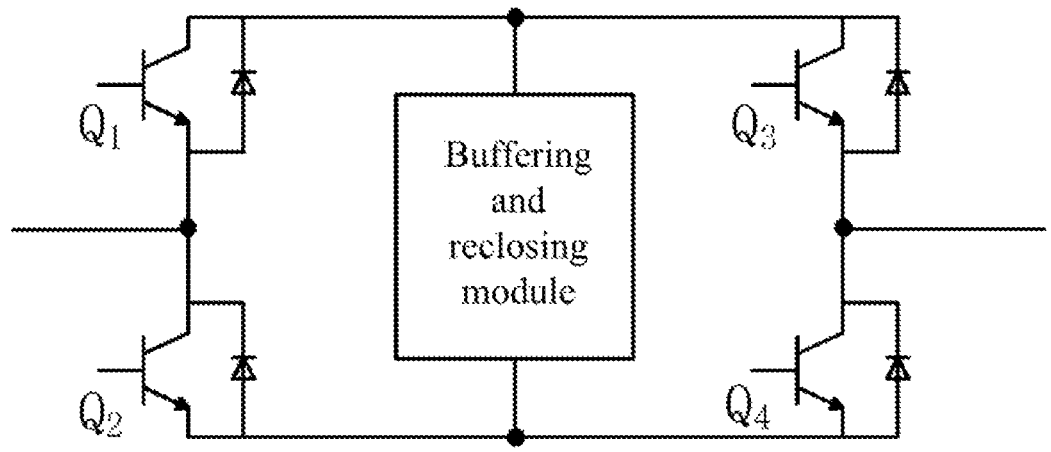
FIG. 1 shows a bridge-type circuit of the present invention.

As shown in FIG. 1, the present invention provides a bridge-type circuit, which includes an H-bridge switch module and a buffering and reclosing module. The H-bridge switch module includes four power semiconductor switch devices Q1 to Q4. Every two of the four power semiconductor switch devices are connected to an anti-parallel diode, Q1 and Q2 are connected in series in the same direction to form a first bridge arm, and Q3 and Q4 are connected in series in the same direction to form a second bridge aim. The first bridge arm and the second bridge arm are further connected in parallel in the same direction. A middle point (a connection point of Q1 and Q2) of the first bridge arm serves as an input terminal of the H-bridge switch module, and a middle point (a connection point of Q3 and Q4) of the second bridge arm serves as an output terminal of the H-bridge switch module.

The buffering and reclosing module is connected in parallel with the first bridge arm and the second bridge arm.

Figure 2:
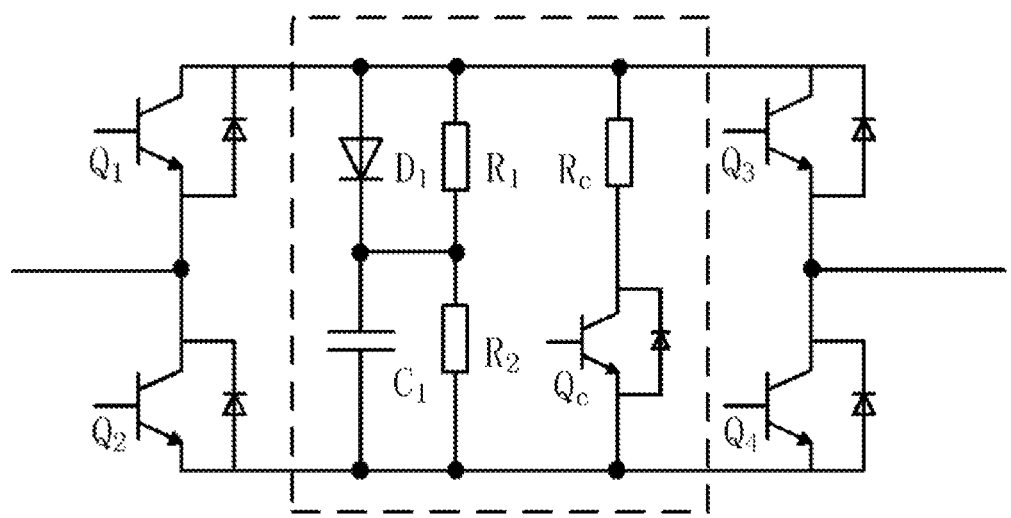
FIG. 2 shows a first embodiment of the bridge-type circuit of the present invention.

The buffering and reclosing circuit has the following six specific embodiments:

A first embodiment of the buffering and reclosing module:

As shown in the dashed box of FIG. 2, the buffering and reclosing module includes an RCD circuit and a reclosing circuit. The RCD circuit includes a diode D1, a capacitor C1, and two resistors R1 and R2, where the diode D1 and the capacitor C are connected in series, the cathode of the diode D1 is connected to one end of the capacitor C1, and the two resistors R1 and R2 are respectively connected in parallel with the diode D1 and the capacitor C1. The reclosing circuit includes a resistor Rc and a power semiconductor switch device Qc that are connected in series. The RCD circuit and the reclosing circuit are connected in parallel.

Figure 3:
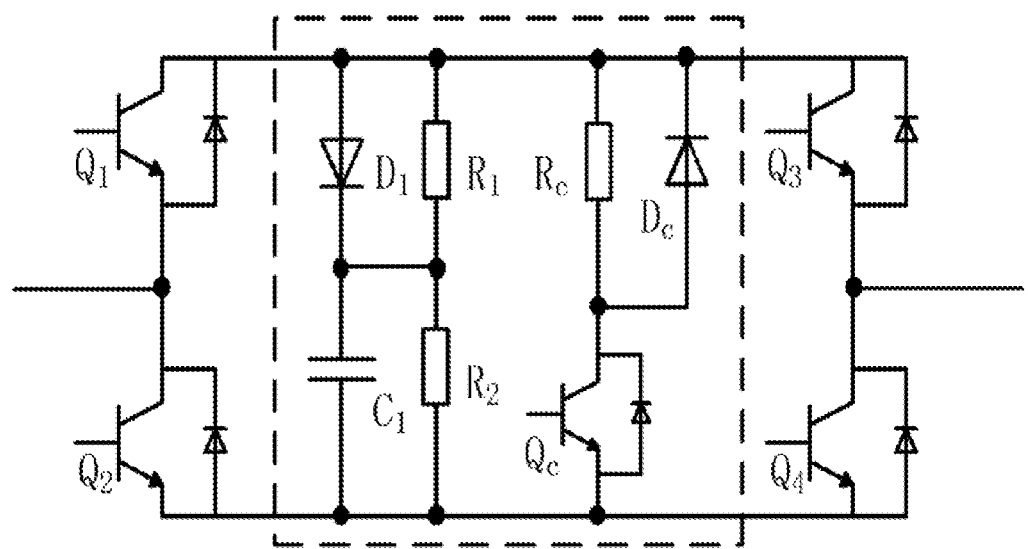
FIG. 3 shows a second embodiment of the bridge-type circuit of the present invention.

A second embodiment of the buffering and reclosing module:

As shown in the dashed box of FIG. 3, the buffering and reclosing module includes an RCD circuit and a reclosing circuit. The RCD circuit includes a diode D1, a capacitor C1, and two resistors R1 and R2, where the diode D1 and the capacitor C1 are connected in series, the cathode of the diode D1 is connected to one end of the capacitor, and the two resistors R1 and R2 are respectively connected in parallel with the diode D1 and the capacitor C1. The reclosing circuit includes a resistor Rc, a power semiconductor switch device Qc, and a diode Dc, where the resistor Rc and the power semiconductor switch device Qc are connected in series, the diode Dc is connected in parallel with the resistor Rc, and the power semiconductor switch device Qc and the diode Dc are in series-opposing connection. The RCD circuit and the reclosing circuit are connected in parallel.

Figure 4:
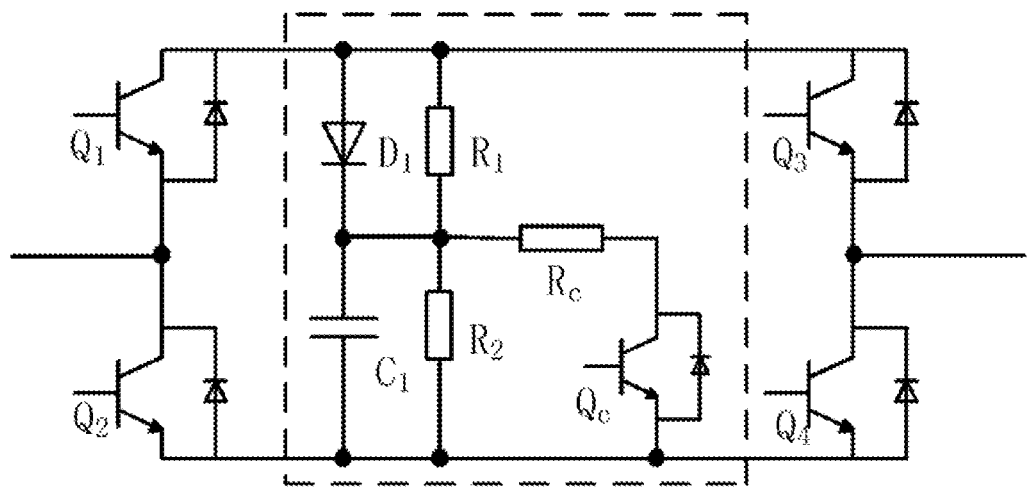
FIG. 4 shows a third embodiment of the bridge-type circuit of the present invention.

A third embodiment of the buffering and reclosing module:

As shown in the dashed box of FIG. 4, the buffering and reclosing module includes an RCD circuit and a reclosing circuit. The RCD circuit includes a diode D1, a capacitor C1, and two resistors R1 and R2, where the diode D1 and the capacitor C1 are connected in series, the cathode of the diode D1 is connected to one end of the capacitor C1, and the two resistors R1 and R2 are respectively connected in parallel with the diode D1 and the capacitor C1. The reclosing circuit includes a resistor Rc and a power semiconductor switch device Qc that are connected in series. The reclosing circuit is connected in parallel with the capacitor C1 of the RCD circuit.

Figure 5:
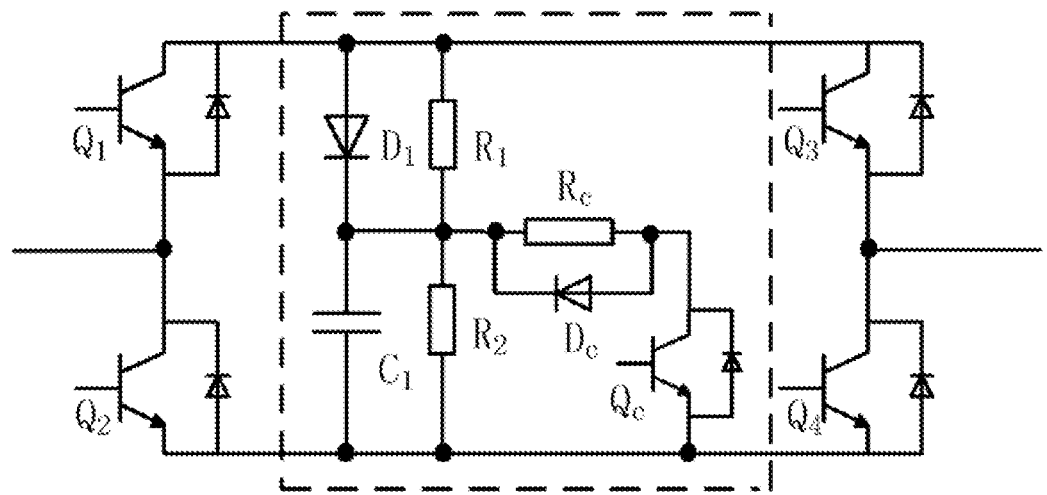
FIG. 5 shows a fourth embodiment of the bridge-type circuit of the present invention.

A fourth embodiment of the buffering and reclosing module:

As shown in the dashed box of FIG. 5, the buffering and reclosing module includes an RCD circuit and a reclosing circuit. The RCD circuit includes a diode D1, a capacitor C1, and two resistors R1 and R2, where the diode D1 and the capacitor C1 are connected in series, the cathode of the diode D1 is connected to one end of the capacitor C1, and the two resistors R1 and R2 are respectively connected in parallel with the diode D1 and the capacitor C1. The reclosing circuit includes a resistor Re, a power semiconductor switch device Qc, and a diode Dc, where the resistor Rc and the power semiconductor switch device Qc are connected in series, the diode Dc is connected in parallel with the resistor Rc, and the power semiconductor switch device Qc and the diode Dc are in series-opposing connection. The reclosing circuit is connected in parallel with the capacitor C1 of the RCD circuit.

Figure 6:
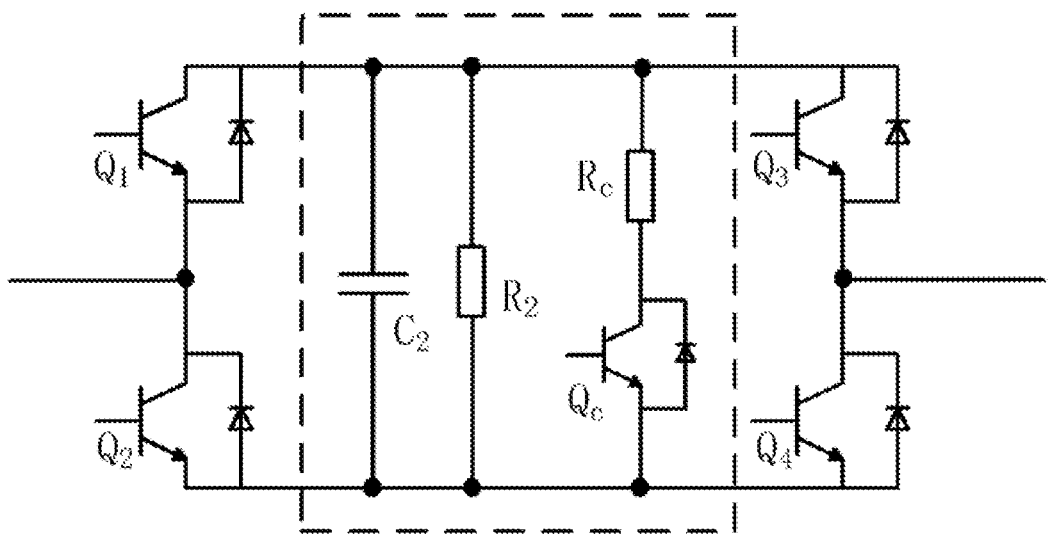
FIG. 6 shows a fifth embodiment of the bridge-type circuit of the present invention.

A fifth embodiment of the buffering and reclosing module:

As shown in the dashed box of FIG. 6, the buffering and reclosing module includes a capacitor C1, a resistor R2, and a reclosing circuit, where the capacitor C1, the resistor R2, and the reclosing circuit are connected in parallel with each other. The reclosing circuit includes a resistor Rc and a power semiconductor switch device Qc. The resistor Rc and the power semiconductor switch device Qc are connected in series.

Figure 7:
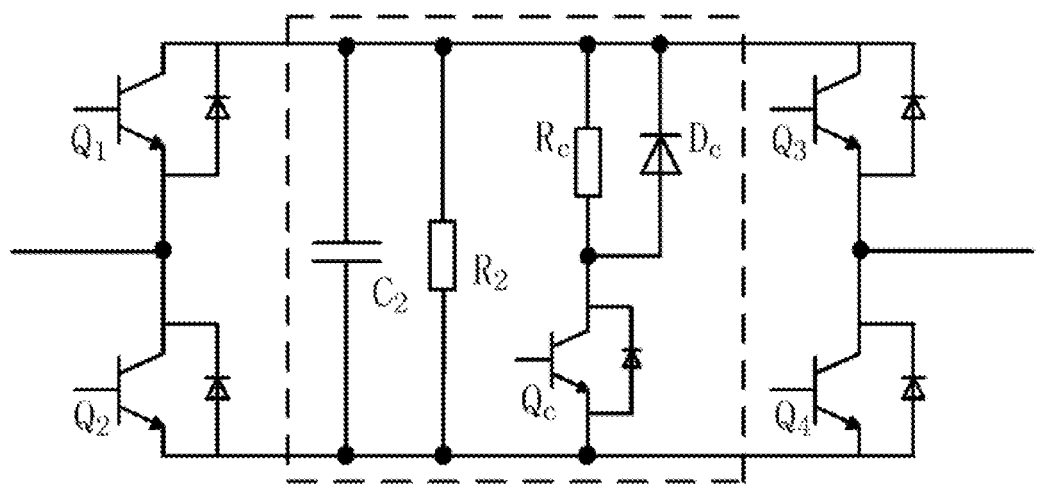
FIG. 7 shows a sixth embodiment of the bridge-type circuit of the present invention.

A sixth embodiment of the buffering and reclosing module:

As shown in the dashed box of FIG. 7, the buffering and reclosing module includes a capacitor C1, a resistor R2, and a reclosing circuit, where the capacitor C1, the resistor R2, and the reclosing circuit are connected in parallel with each other. The reclosing circuit includes a resistor Rc, a power semiconductor switch device Qc, and a diode Dc, where the resistor Rc and the power semiconductor switch device Qc are connected in series, the diode Dc is connected in parallel with the resistor Rc, and the power semiconductor switch device Qc and the diode Rc are in series-opposing connection.

The power semiconductor switch device refers to a full-controlled device. When an insulated gate bipolar transistor (IGBT) or an injection enhanced gate transistor (IEGT) is used, the positive electrode is a collector electrode thereof, and the negative electrode is an emitting electrode thereof. When an integrated gate-commutated thyristor (IGCT) is used as the power semiconductor switch device, the positive electrode is the anode thereof, and the negative electrode is the cathode thereof. When a metal-oxide-semiconductor field-effect transistor (MOSFET) is used as the power semiconductor switch device, the positive electrode is a drain electrode thereof, and the negative electrode is a source electrode thereof. It should be noted that, in a specific implementation, different types of full-controlled devices may be selected as the four power semiconductor switch devices.

Based on the foregoing bridge-type circuit, the present invention further provides a method for controlling the bridge-type circuit, so as to control the bridge-type circuit to work in the following three working modes: a conduction mode, a breaking mode, and a reclosing mode.

1) In the conduction mode, the four power semiconductor switch devices Q1 to Q4 of the H-bridge switch module are all in an on state, while the power semiconductor switch device Qcin the buffering and reclosing module is locked in an off state.

2) In the breaking mode, the four power semiconductor switch devices Q1 to Q4 of the H-bridge switch module are all locked in an off state, and the power semiconductor switch device Qc in the buffering and reclosing module is also locked in an off state.
3) In the reclosing mode, the four power semiconductor switch devices Q1 to Q4 of the H-bridge switch module are all locked in an off state, while the power semiconductor switch device in the buffering and reclosing module is in an on state.

The buffering and reclosing module is mainly used to: 1) reduce a shutdown voltage spike when the power semiconductor device is shut down; 2) reduce a voltage-sharing error caused by asynchronous shutdown of series-connected bridge circuits; and 3) reduce line voltage oscillation during a reclosing operation.

The four power semiconductor devices of the bridge-type circuit share one buffering and reclosing module that is mounted in space defined by the thickness of two power semiconductor devices plus the thickness of two heat-dissipation devices, thus facilitating mode selection for the buffering and reclosing module and its installation. A buffering capacitor C1 with a large capacitance value can be selected due to the large installation space, thus optimizing a voltage sharing effect of the series-connected bridge-type circuits.

The present invention further provides a direct current breaking device, and as shown in FIG. 2, the device includes a conduction branch, a breaking branch, and an energy consumption branch that are mutually connected in parallel. The conduction branch is formed by connecting at least one rapid mechanical switch K1 and a current transfer module in series; the breaking branch is formed by connecting at least one bridge-type circuit in series; and the energy consumption branch is formed by a non-linear resistor.

A specific connection structure of the direct current breaking device is further described in detail below with reference to specific embodiments.

Figure 8:
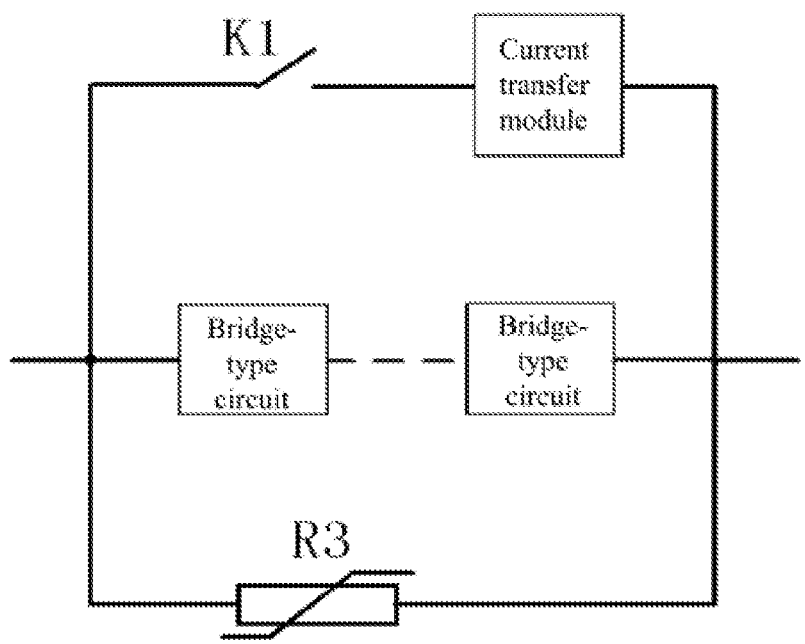
FIG. 8 shows a first embodiment of a direct current breaking device of the present invention.

A first embodiment of the direct current breaking device:

As shown in FIG. 8, one conduction branch, one breaking branch, and one energy consumption branch are set, where the three branches are mutually connected in parallel.

Figure 9:
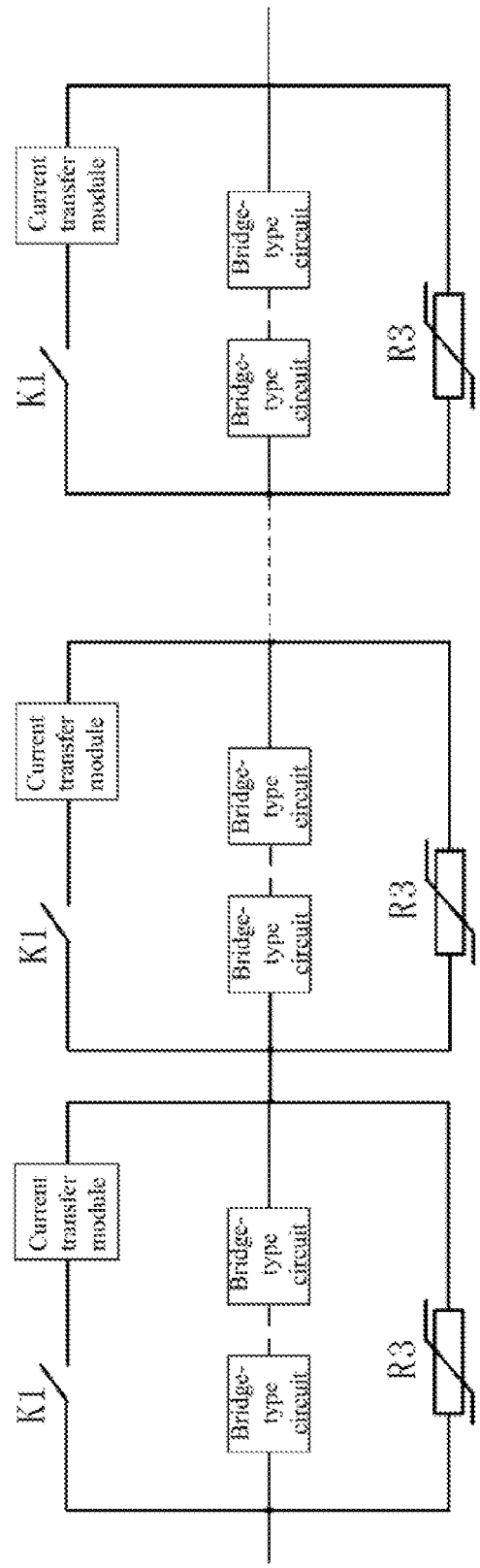
FIG. 9 shows a second embodiment of the direct current breaking device of the present invention.

A second embodiment of the direct current breaking device:

As shown in FIG. 9, a plurality of conduction branches, a plurality of breaking branches, and a plurality of energy consumption branches are set, where the conduction branches, the breaking branches, and the energy consumption branches are mutually connected in parallel in one-to-one correspondence, to form current conduction branches. Then, the conduction branches are sequentially connected in series.

Figure 10:
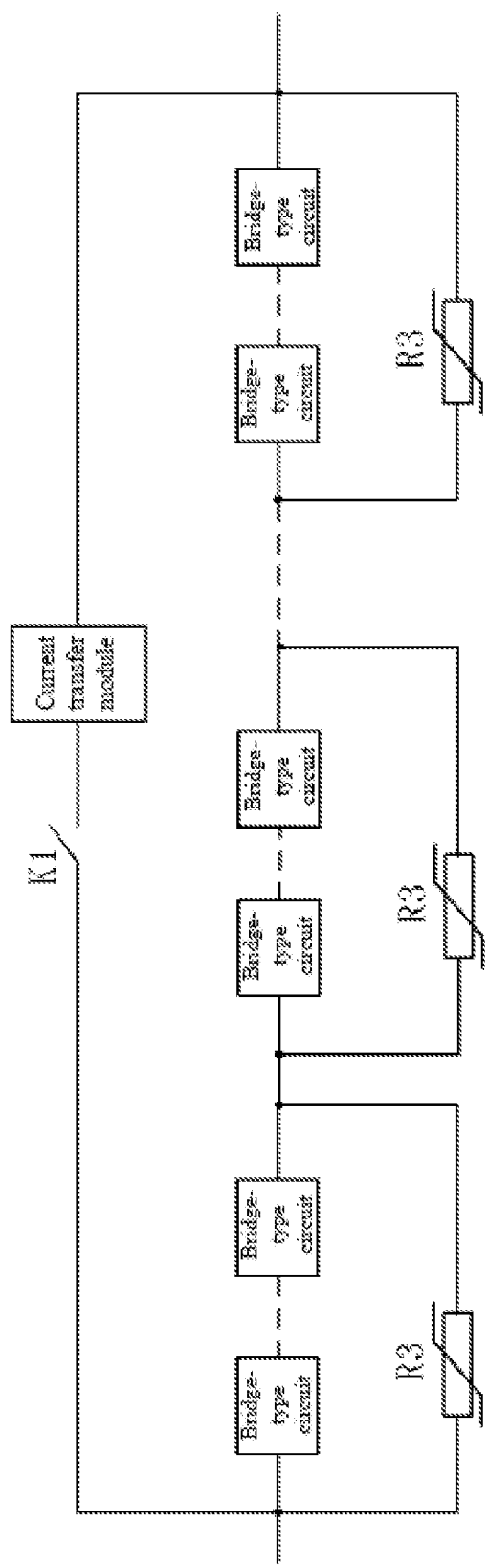
FIG. 10 shows a third embodiment of the direct current breaking device of the present invention.

A third embodiment of the direct current breaking device:

As shown in FIG. 10, two or more breaking branches and energy consumption branches are set, and are connected in parallel in one-to-one correspondence. One conduction branch is set. A sequential series connection is established after all the breaking branches and energy consumption branches are correspondingly connected in parallel; and finally, a branch formed after the series connection is connected in parallel with the conduction branch.

The current transfer module described above has the following five embodiments. The direct current breaking device may use any of the following five types of current transfer modules. The current transfer module is further described below with reference to FIG. 11 to FIG. 15.

Figure 11:
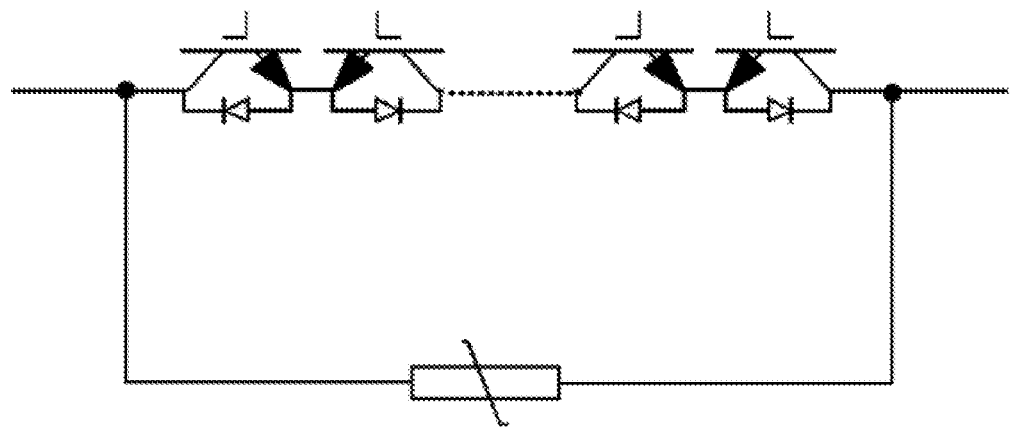
FIG. 11 shows a first embodiment of a current transfer module of the direct current breaking device of the present invention.

A first embodiment of the current transfer module:

As shown in FIG. 11, the current transfer module includes a non-linear resistor and a full-controlled device module that are connected in parallel, where the full-controlled device module includes two or more full-controlled devices that are connected in series, and at least two of the full-controlled devices are connected in series in opposite directions.

Figure 12:
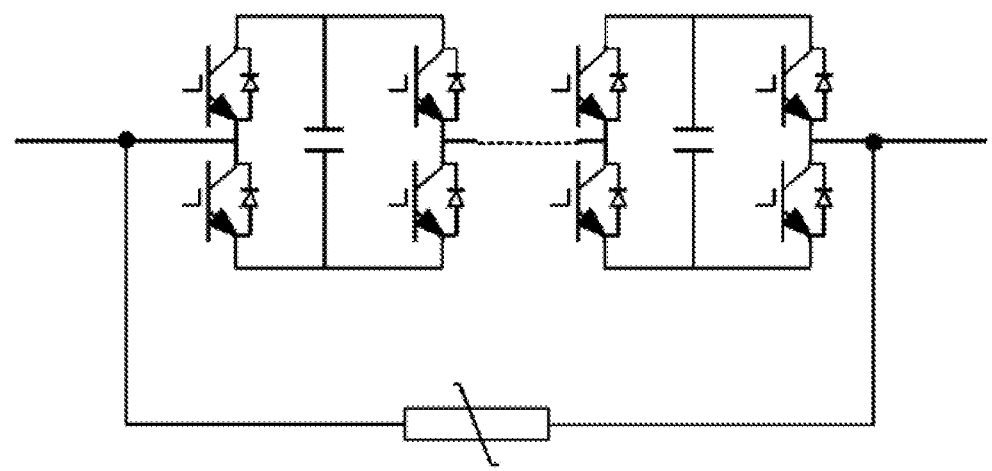
FIG. 12 shows a second embodiment of the current transfer module of the direct current breaking device of the present invention.

A second embodiment of the current transfer module:

As shown in FIG. 12, the current transfer module includes a non-linear resistor and a full-controlled device module that are connected in parallel, where the full-controlled device module is formed by one full-bridge sub-module or by connecting two or more full-bridge sub-modules in series, and the full-bridge sub-module includes four full-controlled devices connected in a bridge type. A capacitor is further connected in parallel between bridge arms of the full-bridge sub-module.

Figure 13:
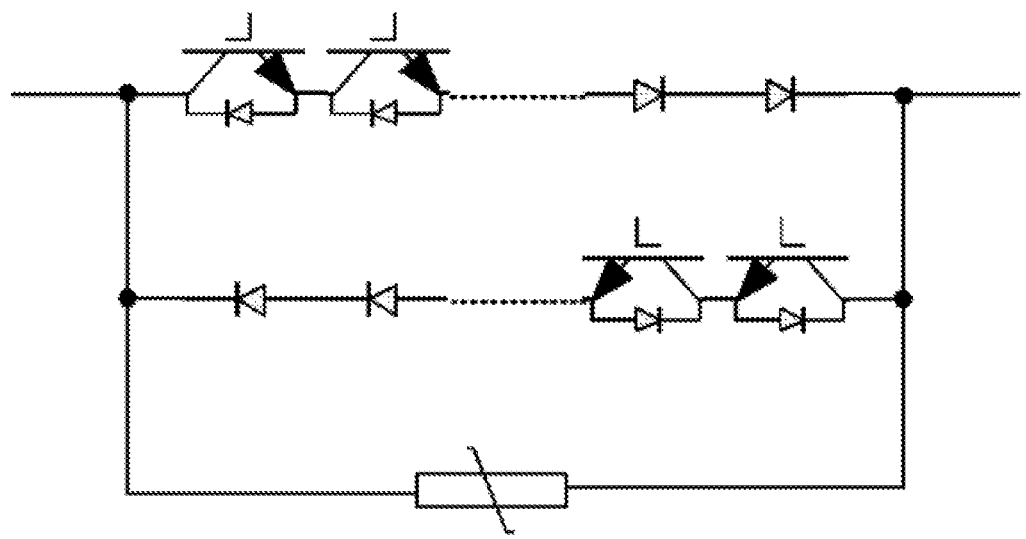
FIG. 13 shows a third embodiment of the current transfer module of the direct current breaking device of the present invention.

A third embodiment of the current transfer module:

As shown in FIG. 13, the current transfer module includes a non-linear resistor and two unidirectional flow modules, where the two unidirectional flow modules are connected in parallel in opposite directions, and then are connected in parallel with the non-linear resistor; and the unidirectional flow module includes at least one pair of power full-controlled devices and at least one pair of non-controlled devices, the full-controlled devices and the non-controlled devices being connected in series in the same direction.

Figure 14:
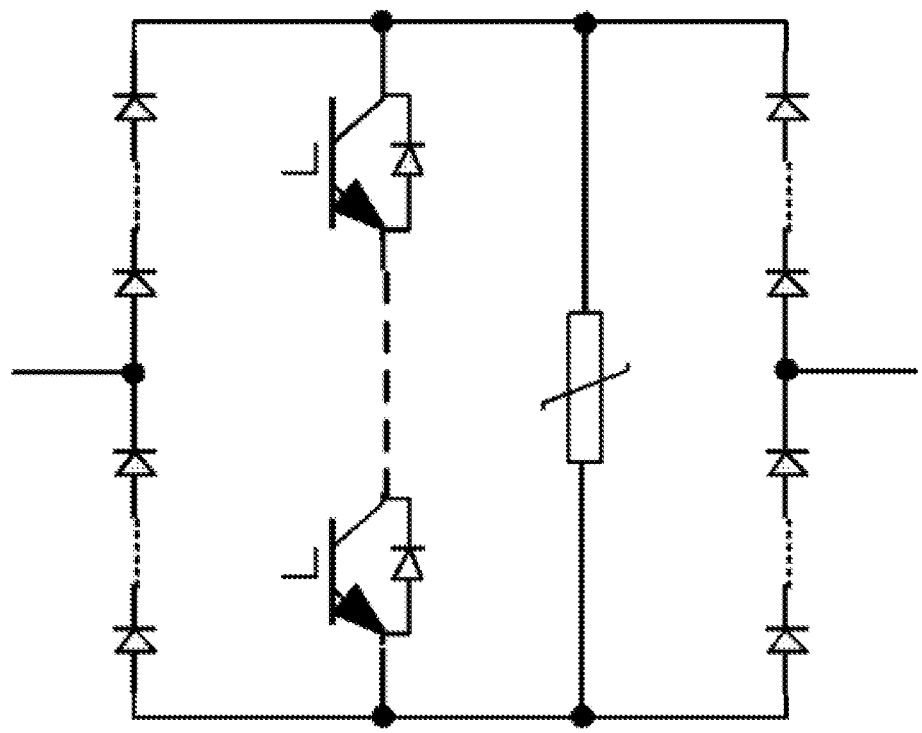
FIG. 14 shows a fourth embodiment of the current transfer module of the direct current breaking device of the present invention.

A fourth embodiment of the current transfer module:

As shown in FIG. 14, the current transfer module includes a non-linear resistor, a full-controlled device series-connected module, and a non-controlled device full-bridge module. The non-linear resistor, the full-controlled device series-connected module, and two bridge arms of the non-controlled device full-bridge module are connected in parallel. The full-controlled device series-connected module includes at least two full-controlled devices connected in series in the same direction. Each bridge arm of the non-controlled device full-bridge module is formed by connecting at least two non-controlled devices in series in a positive direction, and middle points of the two bridge arms respectively serve as an input terminal and an output terminal of the current transfer module.

Figure 15:
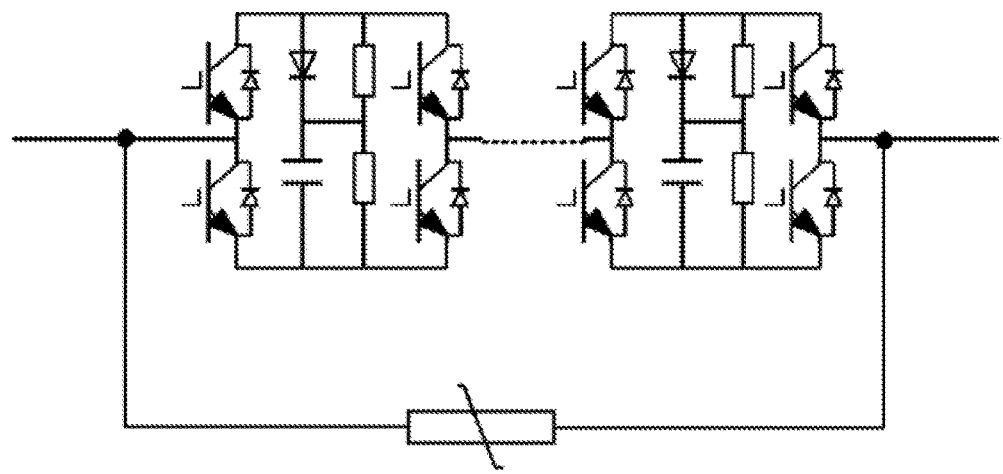
FIG. 15 shows a fifth embodiment of the current transfer module of the direct current breaking device of the present invention.

A fifth embodiment of the current transfer module:

As shown in FIG. 15, the current transfer module includes a non-linear resistor and a full-controlled device module. The full-controlled device module is formed by one full-bridge sub-module or by connecting two or more full-bridge sub-modules in series. The full-bridge sub-module includes four full-controlled devices connected in a bridge type and one RCD module. A bridge arm of the full-bridge sub-module is connected in parallel with the RCD module. The RCD module includes a non-controlled device, a capacitor, and two resistors. The non-controlled device is connected in series with the capacitor, the cathode of the non-controlled device is connected to one end of the capacitor, and the two resistors are respectively connected in parallel with the non-controlled device and the capacitor.

Based on the above direct current breaking device, the present invention further provides a control method, used to control the direct current breaking device to work in the following manners:

1) When a direct current system normally operates, a stable current flows through the rapid mechanical switch and the bridge circuit that are connected in series in the conduction branch. In this case, the rapid mechanical switch of the conduction branch is in a closed state, and the bridge-type circuit thereof is in a connected mode; the bridge-type circuit in the breaking branch is in a disconnected mode; and the voltage at two ends of the capacitor in the RCD buffering module is zero.

2) When the system requires the direct current breaking device to break the current in the case of a short circuit:

① first the bridge-type circuit of the breaking branch is switched on, and then the bridge-type circuit of the conduction branch is switched off;

② after the current is completely transferred from the conduction branch to the breaking branch, the rapid mechanical switch of the conduction branch is switched off; and ③ after the rapid mechanical switch is switched off without an arc, the bridge-type circuit of the breaking branch is switched off; and in this case, the fault current is transferred to the non-linear resistor till system energy is consumed and absorbed, and the direct current breaking device completes current breaking at this time.

3) When the system requires reclosing in a short period after the direct current breaking device completes current breaking:

① the power semiconductor device of the buffering and reclosing module in the bridge-type circuit of the current breaking branch is switched on first, and the bridge-type circuit is in a reclosing mode in this case;

② it is judged whether the fault of transmission line is recovered; where a judgment basis for the transmission line failure recovery may be any one of the following cases: 1) a charging voltage exists on the fault transmission line; 2) no voltage exists at two ends of the current breaking branch; 3) no voltage exists at two ends of each bridge-type circuit in the current breaking branch; and 4) no voltage exists at two ends of the capacitor of the buffering and reclosing module of the bridge-type circuit in the current breaking branch;

③ if the fault is not recovered, the power semiconductor device of the buffering and reclosing module in the bridge-type circuit of the current breaking branch is switched off, and step ⑦ is performed;

④ if the fault is recovered, the bridge-type circuit of the current breaking branch is switched on, and the power semiconductor device of the buffering and reclosing module in the bridge-type circuit of the current breaking branch is switched off;

⑤ the mechanical switch of the current conduction branch is closed, and the power semiconductor device of the current transfer module is switched on;

⑥ the bridge-type circuit of the current breaking branch is switched off; and

⑦ reclosing is ended.

The above embodiments are used to describe the technical solutions of the present invention only, and are not intended to limit the present invention. After reading this application, those skilled in the art may make various variations or modifications to the present invention based on the above embodiments, but all such variations or modifications fall within the protection scope of the present invention as defined by the claims.

What is claimed is:

1. A bridge-type circuit, comprising an H-bridge switch module, wherein the bridge-type circuit further comprises a buffering and reclosing module, the H-bridge switch module comprises four power semiconductor switch devices; every two of the four power semiconductor switch devices are connected in series in the same direction to form a bridge arm, and the two bridge arms are further connected in parallel; middle points of the two bridge arms respectively serve as an input terminal and an output terminal; the buffering and reclosing module is connected in parallel with the two bridge arms of the H-bridge switch module; and the buffering and reclosing module comprises a reclosing circuit and an RCD circuit, or comprises a reclosing circuit, a capacitor, and a resistor.

2. The bridge-type circuit according to claim 1, wherein the buffering and reclosing module comprises an RCD circuit and a reclosing circuit;

the RCD circuit comprises a diode, a capacitor, and two resistors, wherein the diode and the capacitor are connected in series, the cathode of the diode is connected to one end of the capacitor, and the two resistors are respectively connected in parallel with the diode and the capacitor; the reclosing circuit comprises a resistor and a power semiconductor switch device that are connected in series; and the RCD circuit and the reclosing circuit are connected in parallel.

3. The bridge-type circuit according to claim 1, wherein the buffering and reclosing module comprises an RCD circuit and a reclosing circuit;

the RCD circuit comprises a diode, a capacitor, and two resistors, wherein the diode and the capacitor are connected in series, the cathode of the diode is connected to one end of the capacitor, and the two resistors are respectively connected in parallel with the diode and the capacitor;

the reclosing circuit comprises a resistor, a power semiconductor switch device, and a diode, wherein the resistor and the power semiconductor switch device are connected in series, the diode is connected in parallel with the resistor, and the power semiconductor switch device and the diode are in series-opposing connection; and the RCD circuit and the reclosing circuit are connected in parallel.

4. The bridge-type circuit according to claim 1, wherein the buffering and reclosing module comprises an RCD circuit and a reclosing circuit;

the RCD circuit comprises a diode, a capacitor, and two resistors, wherein the diode and the capacitor are connected in series, the cathode of the diode is connected to one end of the capacitor, and the two resistors are respectively connected in parallel with the diode and the capacitor;

the reclosing circuit comprises a resistor and a power semiconductor switch device that are connected in series; and the reclosing circuit is connected in parallel with the capacitor of the RCD circuit.

5. The bridge-type circuit according to claim 1, wherein the buffering and reclosing module comprises an RCD circuit and a reclosing circuit;

the RCD circuit comprises a diode, a capacitor, and two resistors, wherein the diode and the capacitor are connected in series, the cathode of the diode is connected to one end of the capacitor, and the two resistors are respectively connected in parallel with the diode and the capacitor; and the reclosing circuit comprises a resistor, a power semiconductor switch device, and a diode, wherein the resistor and the power semiconductor switch device are connected in series, the diode is connected in parallel with the resistor, and the power semiconductor switch device and the diode are in series-opposing connection; and the reclosing circuit is connected in parallel with the capacitor of the RCD circuit.

6. The bridge-type circuit according to claim 1, wherein the buffering and reclosing module comprises a capacitor, a resistor, and a reclosing circuit, wherein the capacitor, the resistor, and the reclosing circuit are connected in parallel with each other; and the reclosing circuit comprises a resistor and a power semiconductor switch device that are connected in series.

7. The bridge-type circuit according to claim 1, wherein the buffering and reclosing module comprises a capacitor, a resistor, and a reclosing circuit, wherein the capacitor, the resistor, and the reclosing circuit are connected in parallel with each other; and the reclosing circuit comprises a resistor, a power semiconductor switch device, and a diode, wherein the resistor and the power semiconductor switch device are connected in series, the diode is connected in parallel with the resistor, and the power semiconductor switch device and the diode are in series-opposing connection.

8. A method for controlling bridge-type circuits described in claim 1, wherein the method controls the bridge-type circuit to switch among the following three working modes: a conduction mode, a breaking mode, and a reclosing mode;

in the conduction mode, the four power semiconductor switch devices of the H-bridge switch module are all in an on state, while the power semiconductor switch device in the buffering and reclosing module is locked in an off state;

in the breaking mode, the four power semiconductor switch devices of the H-bridge switch module are all locked in an off state, and the power semiconductor switch device in the buffering and reclosing module is also locked in an off state; and in the reclosing mode, the four power semiconductor switch devices of the H-bridge switch module are all locked in an off state, while the power semiconductor switch device in the buffering and reclosing module is in an on state.

9. A direct current breaking device, comprising a conduction branch, a breaking branch, and an energy consumption branch that are mutually connected in parallel, wherein the conduction branch is formed by connecting at least one rapid mechanical switch and a current transfer module in series;

the breaking branch comprises one bridge-type circuit or multiple series-connected bridge-type circuits; and the energy consumption branch is formed by a non-linear resistor; and the bridge-type circuit comprises an H-bridge switch module and a buffering and reclosing module, wherein the H-bridge switch module comprises four power semiconductor switch devices; every two of the four power semiconductor switch devices are connected in series in the same direction to form a bridge arm, and the two bridge arms are further connected in parallel; middle points of the two bridge arms respectively serve as an input terminal and an output terminal; the buffering and reclosing module is connected in parallel with the two bridge arms of the H-bridge switch module; and the buffering and reclosing module comprises a reclosing circuit and an RCD circuit, or comprises a reclosing circuit, a capacitor, and a resistor.

10. The direct current breaking device according to claim 9, wherein:

M conduction branches, M breaking branches, and M energy consumption branches are set, wherein the conduction branches, the breaking branches, and the energy consumption branches are mutually connected in parallel in one-to-one correspondence to Balm M current conduction branches, and the M current conduction branches are sequentially connected in series, M being an integer greater than or equal to 1.

11. The direct current breaking device according to claim 9, wherein two or more breaking branches and energy consumption branches are set, and are connected in parallel in one-to-one correspondence; one conduction branch is set; a sequential series connection is established after all the breaking branches and energy consumption branches are correspondingly connected in parallel; and finally, a branch formed after the series connection is connected in parallel with the conduction branch.

12. The direct current breaking device according to claim 9, wherein the current transfer module in the conduction branch specifically comprises a non-linear resistor and a power semiconductor switch device module that are connected in parallel, the power semiconductor switch device module comprises two or more power semiconductor switch device modules that are connected in series, and at least two of the power semiconductor switch device modules are connected in series in opposite directions.

13. The direct current breaking device according to claim 9, wherein the current transfer module in the conduction branch specifically comprises a non-linear resistor and a power semiconductor switch device module that are connected in parallel, the power semiconductor switch device module is formed by one full-bridge sub-module or by connecting two or more full-bridge sub-modules in series, the full-bridge sub-module comprises four power semiconductor switch devices connected in a bridge type, and a capacitor is further connected in parallel between bridge arms of the Rill-bridge sub-module.

14. The direct current breaking device according to claim 9, wherein the current transfer module in the conduction branch specifically comprises a non-linear resistor and two unidirectional flow modules; the two unidirectional flow modules are connected in parallel in opposite directions, and then are connected in parallel with the non-linear resistor R2; and the unidirectional flow module comprises at least one pair of power semiconductor switch devices and at least one pair of diodes, the power semiconductor switch devices and the diodes being connected in series in the same direction.

15. The direct current breaking device according to claim 9, wherein the current transfer module in the conduction branch specifically comprises a non-linear resistor, a power semiconductor switch device series-connected module, and a diode full-bridge module; the non-linear resistor, the full-controlled device series-connected module and two bridge anus of the diode full-bridge module are connected in parallel; the power semiconductor switch device series-connected module comprises at least two full-controlled devices connected in series in the same direction; and each bridge arm of the diode full-bridge module is formed by connecting at least two non-controlled devices in series in a positive direction, and middle points of the two bridge arms respectively serve as an input terminal and an output terminal of the current transfer module.

16. The direct current breaking device according to claim 9, wherein the current transfer module in the conduction branch specifically comprises a non-linear resistor and a power semiconductor switch module that are connected in parallel; the power semiconductor switch module is formed by one full-bridge sub-module or connecting more than one full-bridge sub-module in series; the full-bridge sub-module comprises four power semiconductor switch devices connected in a bridge type and one RCD module; a bridge arm of the full-bridge sub-module is connected in parallel with the RCD module; the RCD module comprises a diode, a capacitor, and two resistors, the diode being connected in series with the capacitor, the cathode of the diode being connected to one end of the capacitor, and the two resistors are respectively connected in parallel with the diode and the capacitor.

17. A direct current breaking device, comprising a conduction branch, a breaking branch, and an energy consumption branch that are mutually connected in parallel, wherein the conduction branch is formed by connecting at least one rapid mechanical switch and a current transfer module in series;
the breaking branch comprises one bridge-type circuit or multiple series-connected bridge-type circuits; and the energy consumption branch is formed by a non-linear resistor;
the bridge-type circuit comprises an H-bridge switch module and a buffering and reclosing module, wherein the H-bridge switch module comprises four power semiconductor switch devices; every two of the four power semiconductor switch devices are connected in series in the same direction to form a bridge arm, and the two bridge arms are further connected in parallel; middle points of the two bridge aims respectively serve as an input terminal and an output terminal; the buffering and reclosing module is connected in parallel with the two bridge arms of the H-bridge switch module; and the buffering and reclosing module comprises a reclosing circuit and an RCD circuit, or comprises a reclosing circuit, a capacitor, and a resistor; and
the buffering and reclosing module comprises an RCD circuit and a reclosing circuit; the RCD circuit comprises a diode, a capacitor, and two resistors, wherein the diode and the capacitor are connected in series, the cathode of the diode is connected to one end of the capacitor, and the two resistors are respectively connected in parallel with the diode and the capacitor; the reclosing circuit comprises a resistor and a power semiconductor switch device that are connected in series; and the RCD circuit and the reclosing circuit are connected in parallel.

18. A direct current breaking device, comprising a conduction branch, a breaking branch, and an energy consumption branch that are mutually connected in parallel, wherein the conduction branch is formed by connecting at least one rapid mechanical switch and a current transfer module in series;
the breaking branch comprises one bridge-type circuit or multiple series-connected bridge-type circuits; and the energy consumption branch is formed by a non-linear resistor;
the bridge-type circuit comprises an H-bridge switch module and a buffering and reclosing module, wherein the H-bridge switch module comprises four power semiconductor switch devices; every two of the four power semiconductor switch devices are connected in series in the same direction to form a bridge arm, and the two bridge arms are further connected in parallel; middle points of the two bridge arms respectively serve as an input terminal and an output terminal; the buffering and reclosing module is connected in parallel with the two bridge arms of the H-bridge switch module; and the buffering and reclosing module comprises a reclosing circuit and an RCD circuit, or comprises a reclosing circuit, a capacitor, and a resistor; and
the buffering and reclosing module comprises an RCD circuit and a reclosing circuit; the RCD circuit comprises a diode, a capacitor, and two resistors, wherein the diode and the capacitor are connected in series, the cathode of the diode is connected to one end of the capacitor, and the two resistors are respectively connected in parallel with the diode and the capacitor; the reclosing circuit comprises a resistor, a power semiconductor switch device, and a diode, wherein the resistor and the power semiconductor switch device are connected in series, the diode is connected in parallel with the resistor, and the power semiconductor switch device and the diode are in series-opposing connection; and
the RCD circuit and the reclosing circuit are connected in parallel.

19. A direct current breaking device, comprising a conduction branch, a breaking branch, and an energy consumption branch that are mutually connected in parallel, wherein the conduction branch is formed by connecting at least one rapid mechanical switch and a current transfer module in series;
the breaking branch comprises one bridge-type circuit or multiple series-connected bridge-type circuits; and the energy consumption branch is formed by a non-linear resistor;
the bridge-type circuit comprises an H-bridge switch module and a buffering and reclosing module, wherein the H-bridge switch module comprises four power semiconductor switch devices; every two of the four power semiconductor switch devices are connected in series in the same direction to form a bridge arm, and the two bridge arms are further connected in parallel; middle points of the two bridge arms respectively serve as an input terminal and an output terminal; the buffering and reclosing module is connected in parallel with the two bridge arms of the H-bridge switch module; and the buffering and reclosing module comprises a reclosing circuit and an RCD circuit, or comprises a reclosing circuit, a capacitor, and a resistor; and
the buffering and reclosing module comprises an RCD circuit and a reclosing circuit; the RCD circuit comprises a diode, a capacitor, and two resistors, wherein the diode and the capacitor are connected in series, the cathode of the diode is connected to one end of the capacitor, and the two resistors are respectively connected in parallel with the diode and the capacitor; the reclosing circuit comprises a resistor and a power semiconductor switch device that are connected in series; and the reclosing circuit is connected in parallel with the capacitor of the RCD circuit.

20. A direct current breaking device, comprising a conduction branch, a breaking branch, and an energy consumption branch that are mutually connected in parallel, wherein the conduction branch is formed by connecting at least one rapid mechanical switch and a current transfer module in series;
the breaking branch comprises one bridge-type circuit or multiple series-connected bridge-type circuits; and the energy consumption branch is formed by a non-linear resistor;

the bridge-type circuit comprises an H-bridge switch module and a buffering and reclosing module, wherein the H-bridge switch module comprises four power semiconductor switch devices; every two of the four power semiconductor switch devices are connected in series in the same direction to form a bridge arm, and the two bridge arms are further connected in parallel; middle points of the two bridge arms respectively serve as an input terminal and an output terminal; the buffering and reclosing module is connected in parallel with the two bridge arms of the H-bridge switch module; and the buffering and reclosing module comprises a reclosing circuit and an RCD circuit, or comprises a reclosing circuit, a capacitor, and a resistor; and the buffering and reclosing module comprises an RCD circuit and a reclosing circuit; the RCD circuit comprises a diode, a capacitor, and two resistors, wherein the diode and the capacitor are connected in series, the cathode of the diode is connected to one end of the capacitor, and the two resistors are respectively connected in parallel with the diode and the capacitor; and the reclosing circuit comprises a resistor, a power semiconductor switch device, and a diode, wherein the resistor and the power semiconductor switch device are connected in series, the diode is connected in parallel with the resistor, and the power semiconductor switch device and the diode are in series-opposing connection; and the reclosing circuit is connected in parallel with the capacitor of the RCD circuit.

21. A direct current breaking device, comprising a conduction branch, a breaking branch, and an energy consumption branch that are mutually connected in parallel, wherein the conduction branch is formed by connecting at least one rapid mechanical switch and a current transfer module in series;

the breaking branch comprises one bridge-type circuit or multiple series-connected bridge-type circuits; and the energy consumption branch is formed by a non-linear resistor;

the bridge-type circuit comprises an H-bridge switch module and a buffering and reclosing module, wherein the H-bridge switch module comprises four power semiconductor switch devices; every two of the four power semiconductor switch devices are connected in series in the same direction to form a bridge arm, and the two bridge arms are further connected in parallel; middle points of the two bridge arms respectively serve as an input terminal and an output terminal; the buffering and reclosing module is connected in parallel with the two bridge arms of the H-bridge switch module; and the buffering and reclosing module comprises a reclosing circuit and an RCD circuit, or comprises a reclosing circuit, a capacitor, and a resistor; and the buffering and reclosing module comprises a capacitor, a resistor, and a reclosing circuit, wherein the capacitor, the resistor, and the reclosing circuit are connected in parallel with each other; and the reclosing circuit comprises a resistor and a power semiconductor switch device that are connected in series.

22. A direct current breaking device, comprising a conduction branch, a breaking branch, and an energy consumption branch that are mutually connected in parallel, wherein the conduction branch is formed by connecting at least one rapid mechanical switch and a current transfer module in series;

the breaking branch comprises one bridge-type circuit or multiple series-connected bridge-type circuits; and the energy consumption branch is formed by a non-linear resistor;

the bridge-type circuit comprises an H-bridge switch module and a buffering and reclosing module, wherein the H-bridge switch module comprises four power semiconductor switch devices; every two of the four power semiconductor switch devices are connected in series in the same direction to form a bridge arm, and the two bridge arms are further connected in parallel; middle points of the two bridge arms respectively serve as an input terminal and an output terminal; the buffering and reclosing module is connected in parallel with the two bridge aims of the H-bridge switch module; and the buffering and reclosing module comprises a reclosing circuit and an RCD circuit, or comprises a reclosing circuit, a capacitor, and a resistor; and the buffering and reclosing module comprises a capacitor, a resistor, and a reclosing circuit, wherein the capacitor, the resistor, and the reclosing circuit are connected in parallel with each other; and the reclosing circuit comprises a resistor, a power semiconductor switch device, and a diode, wherein the resistor and the power semiconductor switch device are connected in series, the diode is connected in parallel with the resistor, and the power semiconductor switch device and the diode are in series-opposing connection.

23. A method for controlling a direct current breaking device, comprising:

1) when a direct current system normally operates, a rapid mechanical switch of a conduction branch is in a closed state, a current transfer module is in a switch-on state, and a bridge-type circuit of a breaking branch is in a switch-off mode;

2) when the system requires the direct current breaking device to break the current in the case of a short circuit:
   201. the bridge-type circuit of the breaking branch is switched on, and then the current transfer module of the conduction branch is switched off;
   202. after the current is completely transferred from the conduction branch to the breaking branch, the rapid mechanical switch of the conduction branch is switched off; and
   203. after the rapid mechanical switch is switched off without an arc, the bridge-type circuit of the breaking branch is switched off; and in this case, the fault current is transferred to a non-linear resistor till system energy is consumed and absorbed, and the direct current breaking device completes current breaking at this time; and 3) when the system requires reclosing in a short period after the direct current breaking device completes current breaking:
   301. a power semiconductor device of a buffering and reclosing module in the bridge-type circuit of the current breaking branch is switched on, and the bridge-type circuit is in a reclosing mode in this case;
   302. it is judged whether the fault of transmission line is recovered, wherein
      (1) if the fault is not recovered, the power semiconductor device of the buffering and reclosing module in the bridge-type circuit of the current breaking branch is switched off, to terminate reclosing; or
      (2) if the fault is recovered, the bridge-type circuit of the current breaking branch is switched on, the power semiconductor device of the buffering and reclosing module in the bridge-type circuit of the current breaking branch is switched off, and step 303 is performed;

303. the mechanical switch of the current conduction branch is closed, and a power semiconductor device of the current transfer module is switched on;

304. the bridge-type circuit of the current breaking branch is switched off; and

305. reclosing is ended.

24. The method for controlling a direct current breaking device according to claim 23, wherein in step 302, a judgment basis for the transmission line failure recovery comprises the following cases:

1) The fault transmission line is charged;
2) no voltage on the current breaking branch;
3) no voltage on each bridge-type circuit in the current breaking branch; and
4) no voltage on the capacitor of the buffering and reclosing module of the bridge-type circuit in the current breaking branch.

\* \* \* \* \*